(12) United States Patent
Hanaoka et al.

(10) Patent No.: US 7,944,541 B2
(45) Date of Patent: May 17, 2011

(54) LIQUID CRYSTAL DISPLAY DEVICE AND METHOD OF MANUFACTURING THE SAME

(75) Inventors: Kazutaka Hanaoka, Tenri (JP); Yohei Nakanishi, Tenri (JP); Katsufumi Ohmuro, Atsugi (JP); Kunihiro Tashiro, Matsusaka (JP); Norio Sugiura, Sendai (JP); Kengo Kanii, Kumamoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 944 days.

(21) Appl. No.: 11/339,854

(22) Filed: Jan. 26, 2006
(Under 37 CFR 1.47)

(65) Prior Publication Data
US 2007/0024561 A1 Feb. 1, 2007

(30) Foreign Application Priority Data

Jan. 31, 2005 (JP) ................................. 2005-023869

(51) Int. Cl.
*G02F 1/13* (2006.01)
*G02F 1/136* (2006.01)
*G02F 1/1333* (2006.01)
*G02F 1/1335* (2006.01)
*G02F 1/1339* (2006.01)

(52) U.S. Cl. ............ 349/187; 349/41; 349/95; 349/138; 349/155

(58) Field of Classification Search .................... 349/19, 349/33, 41, 86, 139, 155, 183, 191, 187, 349/95, 138
See application file for complete search history.

(56) References Cited

U.S. PATENT DOCUMENTS

| 6,778,229 B2 | 8/2004 | Inoue et al. |
| 6,781,665 B2 | 8/2004 | Nakanishi et al. |
| 6,825,892 B2 | 11/2004 | Inoue et al. |
| 6,894,741 B2 | 5/2005 | Nakanishi et al. |

(Continued)

FOREIGN PATENT DOCUMENTS

JP 2003-149647 5/2003

(Continued)

OTHER PUBLICATIONS

Korean Office Action and partial English translation mailed Apr. 30, 2007 in the corresponding Korean application.

(Continued)

*Primary Examiner* — Mark A Robinson
*Assistant Examiner* — Jerry Blevins
(74) *Attorney, Agent, or Firm* — Nixon & Vanderhye P.C.

(57) ABSTRACT

In accordance with a method of manufacturing a liquid crystal display device including, in a picture element, a first sub-picture-element region where a threshold voltage of the transmittance-applied voltage characteristic is Vth1 and a second sub-picture-element region where a threshold voltage of the transmittance-applied voltage characteristic is Vth2, liquid crystal, which polymerizable components are added to, is filled into the space between a first and a second substrates; thereafter, a voltage V1 slightly higher than the threshold voltage Vth1 is applied to a liquid crystal layer, and is held for a certain length of time; subsequently, a voltage V2 slightly higher than the threshold voltage Vth2 is applied to the liquid crystal layer, and is held for a certain length of time; additionally, a voltage V3 higher than a white-displaying voltage which is applied while the liquid crystal display device is in actual use is applied to the liquid crystal layer, and is held for a certain length of time; then, the polymerizable components are polymerized by irradiation of ultraviolet light; and thus polymers are formed in the liquid crystal layer.

2 Claims, 13 Drawing Sheets

U.S. PATENT DOCUMENTS

| | | | |
|---|---|---|---|
| 6,894,742 B2 | 5/2005 | Inoue et al. | |
| 6,937,300 B2 | 8/2005 | Inoue et al. | |
| 7,110,063 B2 | 9/2006 | Takeda et al. | |
| 7,136,119 B2 | 11/2006 | Inoue et al. | |
| 7,324,175 B2 | 1/2008 | Inoue et al. | |
| 7,391,490 B2 * | 6/2008 | Nakanishi et al. | 349/129 |
| 7,450,206 B2 | 11/2008 | Nakahata et al. | |
| 7,515,214 B2 | 4/2009 | Ueda et al. | |
| 7,656,465 B2 | 2/2010 | Takeda et al. | |
| 2003/0067579 A1 | 4/2003 | Inoue et al. | |
| 2003/0156247 A1 * | 8/2003 | Kishida et al. | 349/187 |
| 2004/0165135 A1 * | 8/2004 | Jones et al. | 349/142 |
| 2005/0030458 A1 * | 2/2005 | Sasabayashi et al. | 349/129 |
| 2006/0087605 A1 | 4/2006 | Sasabayashi et al. | |
| 2006/0109406 A1 | 5/2006 | Sasabayashi et al. | |
| 2006/0125970 A1 | 6/2006 | Inoue et al. | |
| 2007/0019144 A1 * | 1/2007 | Nakanishi et al. | 349/139 |
| 2007/0097279 A1 * | 5/2007 | Sugiura | 349/38 |
| 2007/0139299 A1 * | 6/2007 | Huang et al. | 345/3.1 |
| 2007/0146568 A1 * | 6/2007 | Yamazaki et al. | 349/43 |
| 2008/0170188 A1 * | 7/2008 | Fan Jiang et al. | 349/109 |
| 2008/0316406 A1 | 12/2008 | Inoue et al. | |
| 2009/0167992 A1 | 7/2009 | Ueda et al. | |

FOREIGN PATENT DOCUMENTS

| | | |
|---|---|---|
| JP | 2003-156731 | 5/2003 |
| JP | 2003-177408 | 6/2003 |
| JP | 2004-279904 | 10/2004 |
| JP | 2004-301979 | 10/2004 |
| KR | 10-2004-0082318 | 9/2004 |
| TW | 508628 | 11/2002 |
| TW | 559871 | 11/2003 |
| TW | 569168 | 1/2004 |
| TW | 200426468 | 12/2004 |
| TW | 2005-00716 | 1/2005 |

OTHER PUBLICATIONS

Japanese Office Action and partial English translation mailed Apr. 13, 2010 in the corresponding Japanese application.

Taiwan Office Action and partial English translation mailed May 20, 2010 in the corresponding Taiwan application.

TW Office Action dated Nov. 23, 2010.

* cited by examiner

FIG. 8A
FIG. 8B
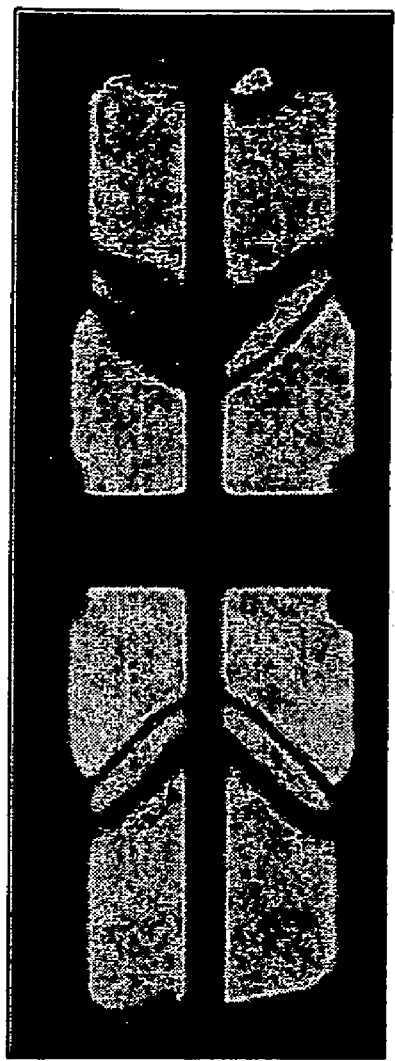
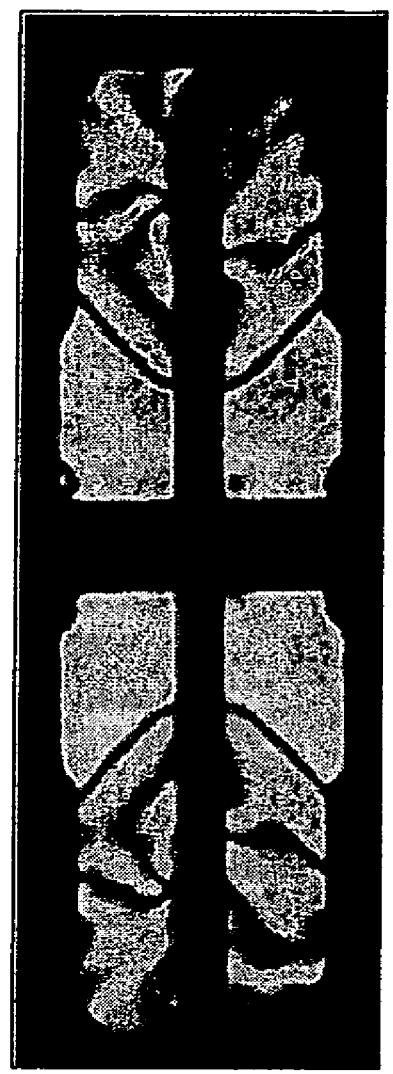

FIG. 11

SAMPLE 1

| STEP | VOLTAGE | | HOLDING TIME | UV IRRADIATION |
|---|---|---|---|---|
| 1 | V5 | AC17V | 30sec | — |
| 2 | V5 | AC17V | — | ON |

SAMPLE 2

| STEP | VOLTAGE | | HOLDING TIME | UV IRRADIATION |
|---|---|---|---|---|
| 1 | V1 | AC2V | 30sec | — |
| 2 | V5 | AC17V | 30sec | — |
| 3 | V5 | AC17V | — | ON |

SAMPLE 3

| STEP | VOLTAGE | | HOLDING TIME | UV IRRADIATION |
|---|---|---|---|---|
| 1 | V1 | AC2V | 30sec | — |
| 2 | V2 | AC2.5V | 30sec | — |
| 3 | V5 | AC17V | 30sec | — |
| 4 | V5 | AC17V | — | ON |

SAMPLE 4

| STEP | VOLTAGE | | HOLDING TIME | UV IRRADIATION |
|---|---|---|---|---|
| 1 | V1 | AC2V | 30sec | — |
| 2 | V2 | AC2.5V | 30sec | — |
| 3 | V4 | AC3.2V | 30sec | — |
| 4 | V5 | AC17V | 30sec | — |
| 5 | V5 | AC17V | — | ON |

SAMPLE 5

| STEP | VOLTAGE | | HOLDING TIME | UV IRRADIATION |
|---|---|---|---|---|
| 1 | V1 | AC2V | 30sec | — |
| 2 | V2 | AC2.5V | 30sec | — |
| 3 | V3 | AC2.8V | 30sec | — |
| 4 | V4 | AC3.2V | 30sec | — |
| 5 | V5 | AC17V | 30sec | — |
| 6 | V5 | AC17V | — | ON |

FIG. 12

|         | EVALUATION |
|---------|------------|
| SAMPLE 1 | × |
| SAMPLE 2 | × |
| SAMPLE 3 | × |
| SAMPLE 4 | △ |
| SAMPLE 5 | ○ |

FIG. 13

| STEP | VOLTAGE | | SAMPLE 6 | SAMPLE 7 | SAMPLE 8 | SAMPLE 9 | SAMPLE 10 | UV IRRADIATION |
|---|---|---|---|---|---|---|---|---|
| 1 | $V_1$ | AC2V | 0.5sec | 2sec | 10sec | 30sec | 60sec | — |
| 2 | $V_2$ | AC2.5V | 0.5sec | 2sec | 10sec | 30sec | 60sec | — |
| 3 | $V_3$ | AC2.8V | 0.5sec | 2sec | 10sec | 30sec | 60sec | — |
| 4 | $V_4$ | AC3.2V | 0.5sec | 2sec | 10sec | 30sec | 60sec | — |
| 5 | $V_5$ | AC17V | 0.5sec | 2sec | 10sec | 30sec | 60sec | — |
| 6 | $V_5$ | AC17V | — | — | — | — | — | ON |
| EVALUATION | | | × | ○ | ○ | ○ | △ | — |

FIG. 14

| STEP | VOLTAGE | | SAMPLE 11 | SAMPLE 12 | SAMPLE 13 | SAMPLE 14 | SAMPLE 15 | UV IRRADIATION |
|---|---|---|---|---|---|---|---|---|
| 1 | $V_1$ | DC2V | 0.5sec | 2sec | 10sec | 30sec | 60sec | — |
| 2 | $V_2$ | DC2.5V | 0.5sec | 2sec | 10sec | 30sec | 60sec | — |
| 3 | $V_3$ | DC2.8V | 0.5sec | 2sec | 10sec | 30sec | 60sec | — |
| 4 | $V_4$ | DC3.2V | 0.5sec | 2sec | 10sec | 30sec | 60sec | — |
| 5 | $V_5$ | DC17V | 0.5sec | 2sec | 10sec | 30sec | 60sec | — |
| 6 | $V_5$ | DC17V | — | — | — | — | — | ON |
| EVALUATION | | | × | ○ | ○ | △ | △ | — |

LIQUID CRYSTAL DISPLAY DEVICE AND METHOD OF MANUFACTURING THE SAME

CROSS-REFERENCE TO RELATED APPLICATIONS

This application is based on and claims priority of Japanese Patent Application No. 2005-023869 filed on Jan. 31, 2005, the entire contents of which are incorporated herein by reference.

BACKGROUND OF THE INVENTION

1. Field of the Invention

The present invention relates to an MVA (Multi-domain Vertical Alignment) mode liquid crystal display device and a method of manufacturing the MVA mode liquid crystal display device. The present invention relates particularly to a liquid crystal display device in which polymers for determining directions in which liquid crystal molecules tilt are formed in a liquid crystal layer, and to a method of manufacturing the same.

2. Description of the Prior Art

In general, a liquid crystal display device is configured of a liquid crystal panel and polarizing plates. The liquid crystal panel is fabricated to contain liquid crystal between two substrates. The polarizing plates are arranged respectively in the two sides of the liquid crystal panel. A picture element electrode is formed in each of picture elements in one substrate of the liquid crystal panel. A common electrode used commonly for the picture elements is formed in the other substrate of the liquid crystal panel. When voltage is applied between the picture element electrode and the common electrode, alignment orientations of liquid crystal molecules change depending on the voltage. As a result, this changes an amount of light which passes through the liquid crystal panel and the polarizing plates arranged respectively on the two sides of the liquid crystal panel. Control of the applied voltage for each of the picture elements makes it possible to display a desired image to be displayed on the liquid crystal display device.

With regard to a TN (Twisted Nematic) mode liquid crystal display device which has been heretofore used widely, liquid crystal with positive dielectric anisotropy is used, and the liquid crystal molecules are twisted and aligned between the two substrates. However, the TN mode liquid crystal display device has a disadvantage of having insufficient viewing angle characteristics. In other words, with regard to the TN mode liquid crystal display device, tone and contrast are extremely deteriorated when the liquid crystal panel is viewed in an oblique direction. Accordingly, the contrast is reversed in extreme cases.

An IPS (In-Plane Switching) mode liquid crystal display device and an MVA (Multi-domain Vertical Alignment) mode liquid crystal display device have been known as liquid crystal display devices which are good at viewing angle characteristics. In the case of the IPS mode liquid crystal display device, picture element electrodes shaped each like a line and common electrodes each shaped like a line are arranged alternately in one of the two substrates. If voltage is applied between the picture element electrodes and the common electrodes, orientations respectively of the liquid crystal molecules change in a plane parallel with the surface of the substrate depending on the voltage.

Although, however, the IPS mode liquid crystal display device is good at viewing angle characteristics, the orientations respectively of the liquid crystal molecules over the picture element electrodes and the common electrodes cannot be controlled. That is because the voltage is applied in a direction parallel with the surface of the substrate. This brings about a disadvantage that the substantial aperture ratio of the IPS mode liquid crystal display device is low, and that the screen is accordingly dark if a powerful backlight is not used.

In the case of the MVA mode liquid crystal display device, picture element electrodes are formed in one of the two substrates, and a common electrode is formed in the other of the two substrates. In addition, with regard to a generally-used MVA mode liquid crystal display device, bank-shaped protrusions made of a dielectric material extending in oblique directions are formed on the common electrode. Each of the picture element electrodes is provided with slits parallel with the protrusions.

In the case of the MVA mode liquid crystal display device, while no voltage is being applied, the liquid crystal molecules are aligned in a direction perpendicular to the substrates. When voltage is applied between the picture element electrode and the common electrode, the liquid crystal molecules are aligned to tilt at an angle corresponding to the voltage. At this time, a plurality of domains are formed in each of the picture element by the slits provided in the picture element electrode and bank-shaped protrusions. The directions in which the liquid crystal molecules tilt vary from one domain to another. Formation of the plurality of domains in each of the picture elements where the directions in which the liquid crystal molecules tilt vary from one domain to another makes it possible to obtain good viewing angle characteristics.

In the case of the aforementioned MVA mode liquid crystal display device, however, the slits and the protrusions decrease the substantial aperture ratio. Accordingly, the substantial aperture ratio of the MVA mode liquid crystal display device is lower than that of the TN mode liquid crystal display device, although the substantial aperture ratio of the MVA mode liquid crystal display device is not so low as that of the IPS mode liquid crystal display device. For this reason, the MVA mode liquid crystal display device needs a powerful backlight. As a result, this kind of MVA mode liquid crystal display device has hardly been adopted for a notebook personal computer, which requires power consumption to be lower.

Japanese Patent Laid-open Official Gazette No. 2003-149647 has disclosed an MVA mode liquid crystal display device which was developed in order to solve the aforementioned problems. FIG. 1 is a plan view showing the MVA mode liquid crystal display device. Incidentally, FIG. 1 shows two picture element regions.

A plurality of gate bus lines 11 extending in the horizontal direction (X-axis direction) and a plurality of data bus lines 12 extending in the vertical direction (Y-axis direction) are formed on one of the two substrates constituting a liquid crystal panel. Insulating films (gate insulating films) are formed between a group of gate bus lines 11 and a group of data bus lines 12. The insulating films electrically isolate the group of gate bus lines 11 from the group of data bus lines 12. Each of the rectangular areas defined by the gate bus lines 11 and the data bus lines 12 is a picture element region.

A TFT (thin film transistor) 14 and a picture element electrode 15 are formed in each picture element region. As shown in FIG. 1, the TFT 14 uses a part of the gate bus line 11 as a gate electrode. A semiconductor film (not illustrated) which functions as an activation layer of the TFT 14 is formed over the gate electrode. In addition, a drain electrode 14a and a source electrode 14b are connected respectively to the two sides of this semiconductor film in the Y-axis direction. The source electrode 14b of the TFT 14 is electrically connected to the data bus line 12, and the drain electrode 14*a* is electrically connected to the picture element electrode 15.

In this patent application, it should be noted that, out of the two electrodes connected to the semiconductor film which functions as the activation layer of the TFT, one electrode connected to the data bus line is termed as a source electrode, and the other electrode connected to the picture element electrode is termed as a drain electrode.

The picture element electrode 15 is formed, for example, of a transparent conductive material such as ITO (Indium-Tin Oxide). Slits 15*a* are formed in this picture element electrode 15 in order to cause liquid crystal molecules to be aligned in four directions when voltage is applied. In other words, the picture element electrode 15 is divided into four domain controlling regions with the center line in parallel with the X-axis and the center line in parallel with the Y-axis defined as boundaries. A plurality of slits 15*a* extending in a direction at an angle of approximately 45 degrees to the X axis are formed in a first region (upper right region). A plurality of slits 15*a* extending in a direction at an angle of approximately 135 degrees to the X axis are formed in a second region (upper left region). A plurality of slits 15*a* extending in a direction at an angle of approximately 225 degrees to the X axis are formed in a third region (lower left region). A plurality of slits 15*a* extending in a direction at an angle of approximately 315 degrees to the X axis are formed in a fourth region (lower right region). A vertical alignment film (not illustrated) made of polyimide is formed on the picture element electrode 15.

Black matrices, color filters and a common electrode are formed in the other substrate. The black matrices are made, for example, of a metal such as Cr (chromium), or of a black resin. The black matrices are arranged respectively in positions, which are opposite to the gate bus lines 11, the data bus lines 12 and the TFTs 14. The color filters are classified into three types, such as red, green and blue. Any one of the three types of color filters is arranged in each of the picture elements. The common electrode is made of a transparent conductive material such as ITO, and is formed on the color filters. A vertical alignment film made of polyimide is formed on the common electrode.

A liquid crystal panel is constituted in the following manner. These two substrates are arranged opposite to each other with spacers (not illustrated) interposed between the two substrates. Liquid crystal with negative dielectric anisotropy is filled in the space between the two substrates. Hereinafter, out of the two substrates constituting the liquid crystal panel, one substrate on which TFTs are formed will be termed as a TFT substrate, and the other substrate which is arranged opposite to the TFT substrate will be termed as an opposing substrate.

In the case of the MVA mode liquid crystal display device shown in FIG. 1, while no voltage is being applied to the picture element electrode 15, the liquid crystal molecules are aligned virtually perpendicularly to the surface of the substrate. While voltage is being applied to the picture element electrode 15, the liquid crystal molecules 10 tilt in directions in which the respective slits 15*a* extend as schematically shown in FIG. 1. Accordingly, four domains are formed in each picture element where the directions in which the liquid crystal molecules 10 tilt vary from one domain to another. This secures good viewing angle characteristics.

Changing the subject, in the case of the MVA mode liquid crystal display device shown in FIG. 1, it remains not to be determined whether the liquid crystal molecules 10 tilt inwards (in directions towards the center of the picture element) or outwards (in directions towards the outsides of the picture element), immediately after voltage is applied to the picture element electrode 15. First of all, the electric field generated from edges of the picture element electrode 15 determines that the liquid crystal molecules 10 in the edges of the picture element electrode 15 (near the data bus line 12) tilt inwards. Subsequently, directions in which the liquid crystal molecules 10 tilt propagate towards the center of the picture element. Accordingly, it takes a long time for all the liquid crystal molecules 10 in a picture element to complete tilting in predetermined directions. This brings about a problem that the response time is long.

Japanese Patent Laid-open Official Gazette No. 2003-149647, which has been mentioned above, disclosed that a liquid crystal display device is fabricated in the following manner. First, liquid crystal to which polymerizable components (monomers) are added is filled into the space between the pair of substrates. Then, voltage is applied between the picture element electrode and the common electrode, thereby causing the resultant liquid crystal to tilt in predetermined directions. Thereafter, beams of ultraviolet light are irradiated on the resultant liquid crystal, and thereby the polymerizable components are polymerized. By this, polymers are made in the liquid crystal layer. In the case of the liquid crystal display device thus manufactured, the polymers in the liquid crystal layer determine directions in which the liquid crystal molecules tilt. For this reason, no sooner is voltage applied between the picture element electrode and the common electrode than all of the liquid crystal molecules in the picture element start to tilt in predetermined directions. Accordingly, the response time is reduced to an extreme extent.

In the process of manufacturing liquid crystal display devices shown in FIG. 1, when polymerizable components added to liquid crystal are polymerized, a voltage (for example, 20V) higher than a voltage (usually, approximately 4 to 6 V) which is applied between picture element electrodes and common electrodes while the liquid crystal display devices are being actually used has heretofore been applied between the picture element electrodes and the common electrodes. That is because the work efficiency is attempted to be enhanced by shortening time needed for liquid crystal molecules to complete tilting in predetermined directions. Through experiments and studies, however, the present applicants have made the following findings. If a higher voltage is applied to the liquid crystal quickly, liquid crystal molecules which are going to tilt in directions different from one another are present in a single domain controlling region at a time. Accordingly, this causes disturbance of the alignment (what is termed as "disclination"). If the polymers are formed by irradiating beams of ultraviolet light on the liquid crystal molecules while the liquid crystal molecules are being in this condition, the liquid crystal molecules are disturbed, too, while the liquid crystal display device is being actually used. This presents a cause of deteriorating the display quality.

In addition, a further enhancement in the display quality has been expected for liquid crystal display devices in recent years. In general, in the case of a vertical alignment (VA) mode liquid crystal display device, it has been known that a T-V characteristic (transmittance-applied voltage characteristic) to be observed when a liquid crystal display device is viewed from the front is different from that to be observed when the liquid crystal display device is viewed in an oblique direction. The MVA mode liquid crystal display devices also have a similar defect. FIG. 2 is a diagram showing a T-V characteristic to be observed when an MVA mode liquid crystal display device is viewed from the front, and a T-V characteristic to be observed when the MVA mode liquid crystal display device is viewed in a direction at an azimuth angle of 90 degrees and at a polar angle of 60 degrees (in a direction downwards diagonally). Incidentally, in FIG. 2, the axis of abscissa represents 256 gray scales into which the gradation from black to white is divided. Each of the gray scales corresponds to a voltage applied to a picture element electrode. The larger a value on the gray scale is, the higher the voltage applied to the picture element electrode is. Furthermore, in FIG. 2, a transmittance is denominated in a value (T/Twhite) relative to the transmittance (Twhite) which is defined as 1 (one) while white is being displayed.

As understood from FIG. 2, in the case of the conventional MVA mode liquid crystal display device, the T-V characteristic to be observed when the liquid crystal display device is viewed from the front is much different from that to be observed when the liquid crystal display device is viewed in the oblique direction. For this reason, the conventional MVA mode liquid crystal display device has a disadvantage that the display quality is deteriorated when viewed in an oblique direction although a preferable display quality can be obtained when viewed from the front. In particular, as understood from FIG. 2, in the case of the conventional MVA mode liquid crystal display device, the line representing the T-V characteristic to be observed when the liquid crystal display device is viewed in the oblique direction undulates to a large extent in comparison with the line representing the T-V characteristic to be observed when the liquid crystal display device is viewed from the front. Accordingly, when middle gray-scales are displayed, the difference in brightness becomes smaller between the viewing from the front and the viewing in the oblique direction. For this reason, a phenomenon occurs in which an image to be viewed in the oblique direction looks whitish (washes out) in comparison with an image to be viewed from the front, thus causing the display quality to be deteriorated. Moreover, an anisotropy in terms of a refractive index of liquid crystal has wavelength dependency. For this reason, it is likely that color to be seen when the conventional MVA mode liquid crystal display device is viewed from the front may be different from that to be seen when the conventional MVA mode liquid crystal display device is viewed in an oblique direction in some cases.

SUMMARY OF THE INVENTION

With the aforementioned matters taken into consideration, an object of the present invention is to provide a method of manufacturing an MVA mode liquid crystal display device whose substantial aperture ratio is so high as to be applicable to a notebook personal computer, and which is far better at display quality, the method being capable of preventing alignment of liquid crystal molecules from being disturbed while polymers are being formed.

In addition, another object of the present invention is to provide an MVA mode liquid crystal display device whose substantial aperture ratio is so high as to be applicable to a notebook personal computer, and which is far better at display quality.

The aforementioned problems are solved by a method of manufacturing a liquid crystal display device including, in a single picture element, a plurality of sub-picture-element regions whose transmittance-applied voltage characteristics are different from one another. The method is characterized by including the following steps. In a first step, liquid crystal, to which polymerizable components are added, is filled in the space between a first substrate and a second substrate. In a second step, voltages slightly higher than threshold voltages respectively of transmittance-applied voltage characteristics of the plurality of sub-picture-element regions are applied to the liquid crystal in a step-by-step basis in the ascending order of the voltages, and thereafter the polymerizable components are polymerized while a far higher voltage is being applied to the liquid crystal.

For example, in accordance with a method of manufacturing a liquid crystal display device including a first sub-picture-element region and a second sub-picture-element region in a single picture element, a liquid crystal display device is manufactured. In the first sub-picture-element region, a threshold voltage of the transmittance-applied voltage characteristic is Vth1. In the second sub-picture-element regions, a threshold voltage of the transmittance-applied voltage characteristic is Vth2 (incidentally, Vth2>Vth1). In this case, the liquid crystal display device is manufactured through performing the following steps. In a first step, liquid crystal, to which polymerizable components are added, is filled in the space between a first substrate and a second substrate. In a second step, a voltage V1 (incidentally, Vth1<V1<Vth2) higher than the threshold voltage Vth1 is applied to the liquid crystal, and the voltage V1 is held. In a third step, a voltage V2 higher than the threshold voltage Vth2 is applied to the liquid crystal, and the voltage V2 is held. In a fourth step, polymers are formed by mean of polymerizing the polymerizable components contained in the liquid crystal while applying a voltage V3 higher than the voltage V2 to the liquid crystal.

In the case of the present invention, while the polymers are being formed, voltages slightly higher than the threshold voltages respectively of the transmittance-applied voltage characteristics of the plurality of sub-picture-element regions are applied to the liquid crystal in a step-by-step basis in the ascending order of the voltages. This makes it possible to form the polymers while inhibiting alignment of the liquid crystal molecules from being disturbed, and to accordingly manufacture liquid crystal display devices which are good at display quality.

It is desirable that a sub-picture-element electrode arranged in at least one sub-picture-element region out of the plurality of sub-picture-element regions in the single picture element be connected directly (in other words, through no capacitive coupling) to a switching element such as a TFT, and that the other sub-picture-element electrodes be connected to the switching element through the respective capacitive couplings.

The aforementioned problems are solved by yet another method of manufacturing a liquid crystal display device including a first sub-picture-element region and a second sub-picture element region in a single picture element. In the first sub-picture-element region, a threshold voltage of the transmittance-applied voltage characteristic is Vth1. In the second sub-picture-element regions, a threshold voltage of the transmittance-applied voltage characteristic is Vth2 (incidentally, Vth2>Vth1). The method is characterized by including the following steps. In a first step, liquid crystal, to which polymerizable polymers are added, is filled in the space between a first substrate and a second substrate. In a second step, a first voltage V1 lower than the threshold voltage Vth1 is applied to the liquid crystal, and the first voltage V1 is held. In a third step, a second voltage V2, which is higher than the threshold voltage Vth1, and which is lower than the threshold voltage Vth2, is applied to the liquid crystal, and the second voltage V2 is held. In a fourth step, a third voltage V3, which is higher than the second voltage V2, and which is lower than the threshold voltage Vth2, is applied to the liquid crystal, and the third voltage V3 is held. In a fifth step, a fourth voltage V4, which is higher than the threshold voltage Vth2 is applied to the liquid crystal, and the fourth voltage V4 is held. In a sixth step, polymers are formed by means of polymerizing the polymerizable components contained in the liquid crystal while the fourth voltage V4 or a fifth voltage V5 which is higher than the fourth voltage V4 is being applied to the liquid crystal.

In the case of the present invention, the first voltage V1, the second voltage V2, the third voltage V3 and the fourth voltage V4 are sequentially applied to the liquid crystal layer. The first voltage V1 is lower than the threshold voltage Vth1. The second voltage V2 is between the threshold voltage Vth1 and the threshold voltage Vth2. The third voltage V3 is between the second voltage V2 and the threshold voltage Vth2. The fourth voltage V4 is higher than the threshold voltage Vth2. This makes it possible to form a monomer while inhibiting alignment of the liquid crystal molecules from being disturbed, and to accordingly manufacture liquid crystal display devices which are good at display quality.

The aforementioned problems are solved by a liquid crystal display device including, in a single picture element, a plurality of sub-picture-element regions whose transmittance-applied voltage characteristics are different from one another. The liquid crystal display device is characterized by including, a first and a second substrates, a liquid crystal layer, polymers and a spacer. The first and the second substrates are arranged opposite to each other. The liquid crystal layer is made of liquid crystal filled in the space between the first and the second substrates. The polymers are formed in the liquid crystal layer, and determine alignment orientations of the liquid crystal molecules while voltage is being applied thereto. The spacer is arranged in a sub-picture-element region which has the lowest threshold voltage of the transmittance-applied voltage characteristic among the sub-picture-element regions or in a region adjacent to the sub-picture-element region, and determines the thickness of the liquid crystal layer.

Alignment controlling force is weaker in a sub-picture-element region which has a higher threshold voltage of the transmittance-applied voltage characteristic than in a sub-picture-element region which has a lower threshold voltage of the transmittance-applied voltage characteristic. For this reason, if the spacer is arranged in a sub-picture-element region which has a higher threshold voltage or in the vicinity of the sub-picture-element region, influence of defect in alignment of the liquid crystal molecules stemming from the spacer spreads over the sub-picture-element region. This decreases the substantial aperture ratio. By contrast, in the case of the present invention, the influence of defect in alignment of the liquid crystal molecules stemming from the spacer is smaller. This makes it possible to prevent the substantial aperture ratio from being decreased. That is because the spacer is arranged in a sub-picture-element region which has the lowest threshold or in a region adjacent to the sub-picture-element region.

BRIEF DESCRIPTION OF THE DRAWINGS

FIG. 8A is a diagram showing a transmission condition of a liquid crystal display device actually manufactured in accordance with the first embodiment. FIG. 8B is a diagram showing a transmission condition of a liquid crystal display device used as a comparative example.

FIG. 11 is a diagram showing conditions in which voltages are applied to each of Samples 1 to 5.

FIG. 12 is a diagram showing results of evaluating alignment conditions of each of Samples 1 to 5.

FIG. 13 is a diagram showing results of evaluating conditions in which voltages are applied to each of Samples 6 to 10 and their alignment conditions.

FIG. 14 is a diagram showing results of evaluating conditions in which voltages are applied to each of Samples 11 to 15 and their alignment conditions.

DESCRIPTION OF THE PREFERRED EMBODIMENTS

Hereinbelow, descriptions will be provided for embodiments of the present invention with reference to the attached drawings.

First Embodiment

Figure 3:
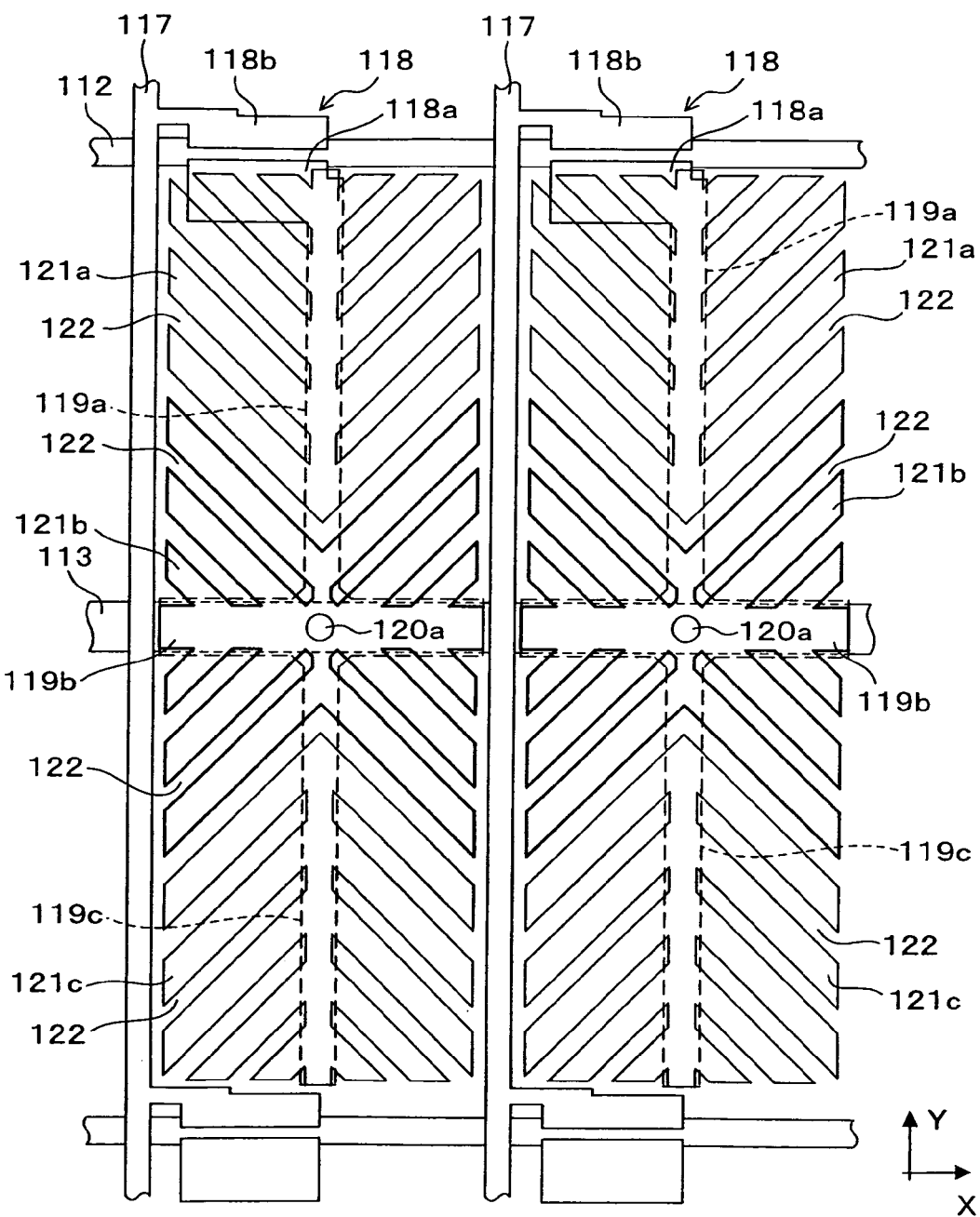
FIG. 3 is a plan view of a liquid crystal display device to be manufactured in accordance with a manufacturing method according to a first embodiment of the present invention.
Figure 4:
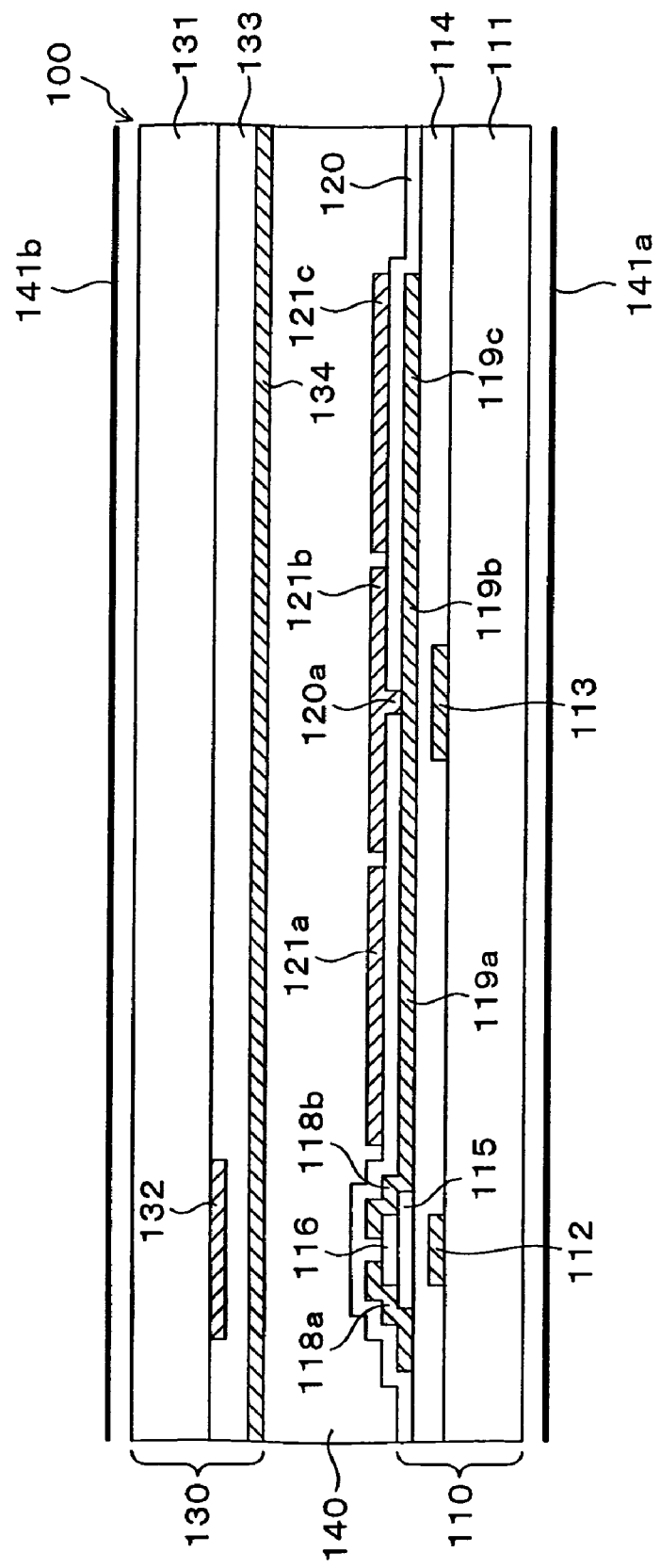
FIG. 4 is a schematic cross-sectional view of the liquid crystal display device to be manufactured in accordance with the manufacturing method according to the first embodiment of the present invention.

FIG. 3 is a plan view of a liquid crystal display device to be manufactured in accordance with a first embodiment of the present invention. FIG. 4 is a cross-sectional schematic view of the liquid crystal display device to be manufactured in accordance with the first embodiment. Incidentally, FIG. 3 shows two picture element regions.

As shown in FIG. 4, a liquid crystal panel 100 is configured of a TFT substrate 110, an opposing substrate 130 and a liquid crystal layer 140. The liquid crystal layer 140 is made of liquid crystal with negative dielectric anisotropy, which is contained in the space between the TFT substrate 110 and the opposing substrate 130. Polarizing plates 141a and 141b are arranged respectively in the two sides in the thickness direction of this liquid crystal panel 100. The liquid crystal layer 140 includes polymers which have been formed in the following process. Polymerizable components (monomers or oligomers) are added to the liquid crystal, and beams of ultraviolet light are irradiated on the polymerizable components. Thereby, the polymerizable components are polymerized into the polymers.

A plurality of gate bus lines 112 extending in the horizontal direction (X-axis direction) and a plurality of data bus lines 117 extending in the vertical direction (Y-axis direction) are formed in the TFT substrate 110, as shown in FIG. 3. Each of rectangle regions defined by these gate bus lines 112 and these data bus lines 117 is a picture element region. In addition, auxiliary capacitance bus lines 113 are formed in the TFT substrate 110. The auxiliary capacitance bus lines 113 are arranged respectively in parallel with the gate bus lines 112, and each of the auxiliary capacitance bus lines 113 traverses the center of the picture element region. In the case of this embodiment, the absorption axis of one of the polarizing plates 141a and 141b is arranged in parallel with the gate bus line 112, and the absorption axis of the other of the polarizing plates 141a and 141b is arranged in parallel with the data bus line 117.

A TFT 118, three sub-picture-element electrodes 121a to 121c, control electrodes 119a and 119c, and an auxiliary capacitance electrode 119b are formed in each of the picture element regions. The sub-picture-element electrodes 121a to 121c are made of a transparent conductive material such as ITO. Each of the sub picture element electrodes 121a to 121c is provided with slits 122 which regulate alignment orientations of liquid crystal molecules when voltage is applied.

Hereinbelow, detailed descriptions will be provided for the TFT substrate 110 and the opposing substrate 130 with reference to the plan view of FIG. 3 and the cross-sectional schematic view of FIG. 4.

The gate bus line 112 and the auxiliary capacitance bus line 113 are formed on a glass substrate 111 which is a base for the TFT substrate 110.

A first insulating film 114 (gate insulating film) made, for example, of $SiO_2$, SiN or the like is formed over the gate bus line 112 and the auxiliary capacitance bus line 113. A semiconductor film 115 (for example, an amorphous silicon film or a polysilicon film) which serves as an activation layer of the TFT 118 is formed in a predetermined area on the first insulating film 114. A channel protecting film 116 made of SiN or the like is formed on top of the semiconductor film 115. A drain electrode 118a and a source electrode 118b of the TFT 118 are formed respectively on the two sides of the channel protecting film 116 in the Y-axis direction.

In addition, the data bus line 117 connected to the source electrode 118b of the TFTs 118, the control electrodes 119a and 119c connected to the drain electrodes 118a of the TFTs 118, and the auxiliary capacitance electrodes 119b are formed on the first insulating film 114. As shown in FIG. 4, the auxiliary capacitance electrode 119b is formed in a position opposite to the auxiliary capacitance bus line 113 with the first insulating film 114 interposed between the auxiliary capacitance electrodes 119b and the corresponding auxiliary capacitance bus lines 113. An auxiliary capacitance is constituted of the auxiliary capacitance bus line 113, the auxiliary capacitance electrode 119b and the first insulating film 114 which is interposed between the auxiliary capacitance bus line 113 and the auxiliary capacitance electrode 119b. In addition, the control electrodes 119a and 119c are arranged along the center line of the picture element region, the center line being in parallel with the Y axis. The auxiliary capacitance electrode 119b is arranged along the center line of the picture element region, the center line being in parallel with the X axis.

A second insulating film 120 made, for example, of SiN is formed over the data bus line 117, the drain electrode 118a, the source electrode 118b, the control electrodes 119a and 119c, and the auxiliary capacitance electrode 119b. The three sub-picture-element electrodes 121a to 121c are formed on the second insulating film 120. As shown in FIG. 4, the sub-picture-element electrode 121a is capacitively coupled with the control electrode 119a with the second insulating film 120 interposed between the sub-picture-element electrode 121a and the control electrode 119a. The sub-picture-element electrode 121c is capacitively coupled with the control electrode 119c with the second insulating film 120 interposed between the sub-picture-element electrode 121c and the control electrode 119c. In addition, the sub-picture-element electrode 121b is electrically connected with the auxiliary capacitance electrode 119b through a contact hole 120a which is made in the second insulating film 120.

As shown in FIG. 3, the sub-picture-element electrode 121a is arranged in an upper portion in the Y-axis direction of the picture element region. The sub-picture-element electrode 121a is divided into the two bilaterally symmetrical domain controlling regions with the center line in parallel with the Y axis defined as the boundary. A plurality of slits 122 extending in a direction at an angle of approximately 45 degrees to the X axis are formed in the right region. A plurality of slits 122 extending in a direction at an angle of approximately 135 degrees to the X axis are formed in the left region.

The sub-picture-element electrode 121b is arranged in the center of the picture element region, and is divided into the four domain controlling regions by the center line in parallel with the X axis and the center line in parallel with the Y axis. A plurality of slits 122 extending in a direction at an angle of approximately 45 degrees to the X axis are formed in a first region located upper right. A plurality of slits 122 extending in a direction at an angle of approximately 135 degrees to the X axis are formed in a second region located upper left. A plurality of slits 122 extending in a direction at an angle of approximately 225 degrees to the X axis are formed in a third region located lower left. A plurality of slits 122 extending in a direction at an angle of approximately 315 degrees to the X axis are formed in a fourth region located lower right.

The sub-picture-element electrode 121c is arranged in a lower portion in the Y-axis direction of the picture element region. The sub-picture-element electrode 121c is divided into the two bilaterally symmetrical domain controlling regions with the center line in parallel with the Y axis defined as the boundary. Moreover, a plurality of slits 122 extending in a direction at an angle of approximately 225 degrees to the X axis are formed in the left region. A plurality of slits 122 extending in a direction at an angle of approximately 315 degrees to the X axis are formed in the right region. The width of each of the slits 122 of the sub-picture-element electrodes 121a to 121c is, for example, 3.5 μm. The width of a conductive part (hereinafter referred to as a microelectrode part) between each two neighboring slits is, for example, 6 μm.

A vertical alignment film (not illustrated) made of polyimide or the like is formed over the sub-picture-element electrodes 121a to 121c.

On the other hand, black matrices (light blocking film) 132, color filters 133 and a common electrode 134 are formed on one surface (on the lower side in FIG. 4) of a glass substrate 131 which serves as a base of the opposing substrate 130.

The black matrices 132 are formed of a metal such as Cr (chromium), or of a black resin. Each of the black matrices 132 is arranged in a position opposite to the gate bus line 112, the data bus line 117 and the TFT 118 on the TFT substrate 110. Color filters 133 are classified into three types, such as red (R), green (G) and blue (B). A color filter with any one of the three colors is arranged in each of the picture elements.

One pixel is comprised of three neighboring picture elements of a red picture element, a green picture element and a blue picture element. The pixel is designed to be capable of displaying various colors.

The common electrode 134 is formed of a transparent conductive material such as ITO, and is arranged on the color filter 133 (on the lower side of the color filter 133 in FIG. 4). A vertical alignment film (not illustrated) made of polyimide or the like is formed on the common electrode 134 (on the lower side of the common electrode 134 in FIG. 4).

In the case of the liquid crystal display device thus configured according to this embodiment, when a display signal is applied to the data bus line 117 and concurrently a predetermined voltage (scan signal) is applied to the gate bus line 112, the TFT 118 are turned on. Thereby, the display signal is transmitted to the control electrodes 119*a* and 119*c* as well as the auxiliary capacitance electrodes 119*b*. The sub-picture-element electrode 121*b* is connected to the auxiliary capacitance electrode 119*b* through the contact hole 120*a*. For this reason, the voltage of the sub-picture-element electrode 121*b* is equal to the voltage of the display signal.

On the other hand, a voltage corresponding to a value on a capacitance between a group of the sub-picture-element electrodes 121*a* and 121*c* as well as a group of the control electrodes 119*a* and 119*c* is applied commonly to the sub-picture-element electrodes 121*a* and 121*c*. At this point, a voltage V1 to be applied commonly to the sub-picture-element electrodes 121*a* and 121*c* is expressed by $$V1 = VD \cdot C2/(C1+C2)$$

where the voltage representing the display signal is denoted by VD; a value on a capacitance between a group of the sub-picture-element electrodes 121*a* and 121*c* as well as the common electrode 134 is denoted by C1; and a value on a capacitance between the group of the sub-picture-element electrodes 121*a* and 121*c* as well as a group of the control electrodes 119*a* and 119*c* is denoted by C2.

In other words, a voltage lower than a voltage applied to the sub-picture-element electrode 121*b* is applied commonly to the sub-picture-element electrodes 121*a* and 121*c*. This means that the single picture element has regions of two types which are different from each other in T-V characteristic (transmittance-applied voltage characteristic). In addition, the summation of the two T-V characteristics respectively of the regions of two types represents the transmittance-applied voltage characteristics of the overall picture element. It has been known that, if a plurality of sub-picture-element regions which are different from one another in transmittance-applied voltage characteristic are formed in a single picture element, this formation makes it possible to avoid deterioration in display quality to be observed when the screen is viewed in an oblique direction (see Japanese Patent Laid-open Official Gazette No. 2004-279904). In addition, a method of preventing the wash out by means of forming a plurality of sub-picture-element regions which are different from one another in this manner is termed as the HT (half tone gray scale) method.

In the case of this embodiment, the values on capacitances C1 and C2 are set up in a way that approximately 1.5V is the difference between a threshold voltage of the transmittance-applied voltage characteristic in the region where the sub-picture-element electrode 121*b* is arranged and a threshold voltage of the transmittance-applied voltage characteristic commonly in the regions where the respective sub-picture-element electrodes 121*a* and 121*c* are arranged. The sub-picture-element electrode 121*b* is a sub-picture-element electrode connected to the TFT through no capacitive coupling. Hereinafter, the sub-picture-element electrode 121*b* is referred to as a "directly-connected picture element electrode." The sub-picture-element electrodes 121*a* and 121*c* are sub-picture-element electrodes connected to the TFT through capacitive coupling. Hereinafter, the sub-picture-element electrodes 121*a* and 121*c* are referred to as "capacitively-coupled picture element electrodes."

Figure 5:
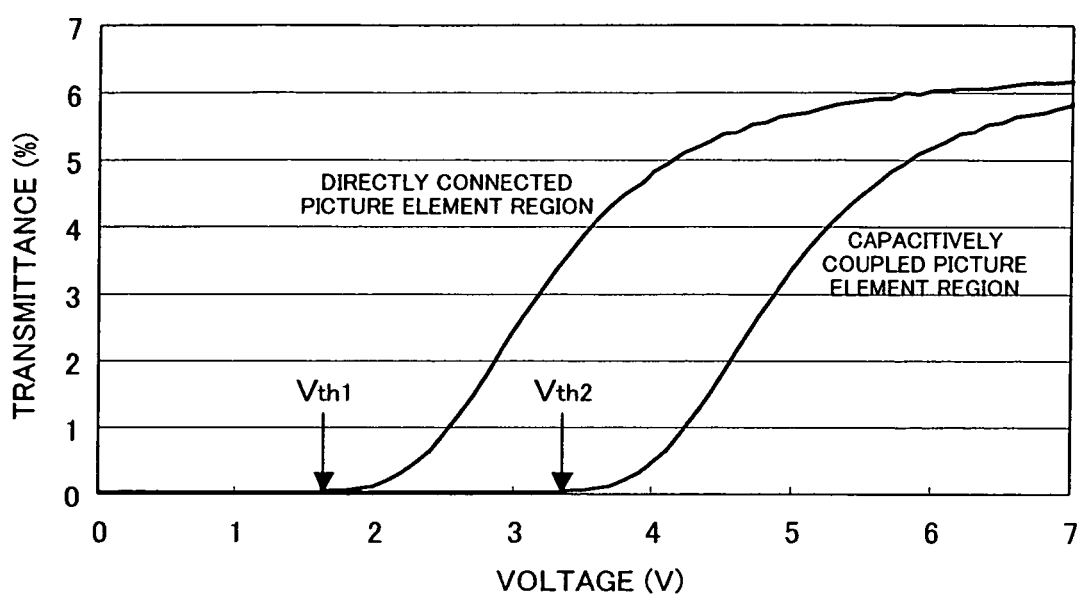
FIG. 5 is a diagram showing a T-V characteristic in a directly-connected picture element region and a T-V characteristic in capacitively-coupled picture element regions.

FIG. 5 is a diagram showing a T-V characteristic in a region where a directly connected picture element electrode is arranged (hereinafter referred to as a "directly connected picture element region") and a T-V characteristic in regions where the respective capacitively coupled picture element electrodes are arranged (hereinafter referred to as "capacitively coupled picture element regions"). In FIG. 5, the axis of abscissa represents voltage applied, and the axis of ordinate represents transmittance. In the case of this embodiment, as shown by FIG. 5, the threshold voltage Vth1 of the T-V characteristic in the directly connected picture element region is approximately 1.8 V, and the threshold voltage Vth2 of the T-V characteristic in the capacitively coupled picture element regions is approximately 3.3 V.

It should be noted that, through experiments and examinations, the present applicants have made the following findings. In a case where the area of the capacitively coupled picture element regions is smaller than 20% of the area of all the sub-picture-element regions (the directly connected picture element region plus the capacitively coupled picture element regions) and in a case where the area of the capacitively coupled picture element regions exceeds 80% of the area of all the sub-picture-element regions, the HT method does not make it possible to fully obtain an effect of preventing the wash-out. For this reason, it is desirable that a ratio of the area of the capacitively coupled picture element regions to the area of all the sub-picture-element regions (the directly connected picture element region plus the capacitively coupled picture element regions) be 20% to 80%.

In the case of this embodiment, no beam of light is transmitted in areas around a boundary between each two neighboring domain controlling regions whose slits 122 extend in directions which are different from one region to another, or in an area along the center line in parallel with the X axis of the picture element region and in an area along the center line in parallel with the Y axis of the picture element region. This is because liquid crystal molecules in such areas are aligned in a direction in parallel with the X axis or in a direction in parallel with the Y axis (i.e. in directions, in parallel with, or orthogonal to, the absorption axes respectively of the polarizing plates 141*a* and 141*b*) when voltage is applied. In the case of this embodiment, the control electrodes 119*a* and 119*c* as well as the auxiliary capacitance electrode 119*b* are provided only to these boundary areas. For this reason, reduction in the aperture ratio can be minimized, although provision of the control electrodes 119*a* and 119*c* as well as the auxiliary capacitance electrode 119*b* reduces the aperture ratio.

Hereinbelow, descriptions will be provided for a method of manufacturing the liquid crystal display device according to this embodiment with reference to FIGS. 3 and 4.

To begin with, the glass substrate 111 to serve as the base of the TFT substrate 110 is got ready for use. Subsequently, a metallic film obtained by superposing, for example, Al (Aluminum) and Ti (Titanium) is formed on this glass substrate 111. Thereafter, this metallic film is patterned by use of the photolithography method. Thus, the gate bus lines 112 and the auxiliary capacitance bus lines 113 are formed. In this case, for example, the gate bus lines 112 are formed with a pitch of approximately 300 μm in the Y-axis direction.

Then, the first insulating film (gate insulating film) 114 made, for example, of an insulating material such as SiO$_2$ or SiN is formed on the entire upper surface of the resultant glass substrate 111. Thence, the semiconductor film (amorphous silicon film or polysilicon film) 115 which serves as the activation layer of the TFT 118 is formed in a predetermined area on the first insulating film 114.

Subsequently, a SiN film is formed on the entire upper surface of the resultant glass substrate 111. Thereafter, the SiN film is patterned by use of the photolithography method. Thereby, the channel protecting film 116 is formed on top of an area which serves as the channel of the semiconductor film 115.

Then, an ohmic contact layer (not illustrated) made of a semiconductor film which is obtained by introducing impurities in high concentration is formed on the entire upper surface of the resultant glass substrate 111. Thence, a metallic film obtained by superposing, for example, Ti, Al and Ti in this sequence is formed on the resultant glass substrate 111. Thereafter, this metallic film and the ohmic contact layer are patterned by use of the photolithography method. Thus, the data bus lines 117, the drain electrodes 118a, the source electrodes 118b, the control electrodes 119a and 119c, and the auxiliary capacitance electrodes 119b are formed. In this case, for example, the data bus lines 117 are formed with a pitch of approximately 100 μm in the X-axis direction.

Subsequently, the second insulating film 120 made, for example, of an insulating material such as SiO$_2$ or SiN is formed on the entire upper surface of the resultant glass substrate 111. Then, the contact holes 120a which respectively reach the auxiliary capacitance electrodes 119b are formed in the second insulating film 120.

Then, the entire upper surface of the resultant glass substrate 111 is sputtered with ITO. Thereby, the ITO film is formed. This ITO film is electrically connected with the auxiliary capacitance electrodes 119b through the contact holes 120a. Thereafter, the ITO film is patterned by use of the photolithography method. Thereby, the sub-picture-element electrodes 121a to 121c are formed. The slits 122 extending in oblique directions are formed in each of the sub-picture-element electrodes 121a to 121c, as described above.

Subsequently, polyimide is applied to the entire upper surface of the glass substrate 111. Thereby, the alignment film is formed. Accordingly, the TFT substrate 110 is completed.

Next, descriptions will be provided for a method of manufacturing the opposing substrate 130.

To begin with, the glass substrate 131 to serve as the base of the opposing substrate 130 is got ready for use. Subsequently, the black matrices 132 are formed of Cr (Chromium) or a black resin in the predetermined areas of the resultant glass substrate 131. The black matrices 132 are formed, for example, in the respective positions opposite to the gate bus lines 112, the data bus lines 117, and the TFTs 118 in the TFT substrate 110.

Then, red, green and blue color filters 133 are formed on the resultant glass substrate 131 by use of red, green and blue photosensitive resins respectively.

Subsequently, the entire upper surface of the resultant glass substrate 131 is sputtered with ITO. Thereby, the common electrode 134 is formed. Thereafter, polyimide is applied to the top of the common electrode 134. By this, the alignment film is formed on the common electrode 134. Accordingly, the opposing substrate 130 is completed.

The TFT substrate 110 and the opposing substrate 130, which have been thus manufactured, are arranged opposite to each other with a spacer (not illustrated) interposed in between. Thereafter, liquid crystal with negative dielectric anisotropy is filled into the space between the TFT substrate 110 and the opposing substrate 130. The liquid crystal panel 100 is manufactured in this manner. For example, diacrylate to serve as polymerizable components is beforehand added to the liquid crystal by 0.3 wt %. In addition, the interval (cell gap) between the TFT substrate 110 and the opposing substrate 130 is, for example, 3.5 μm to 4 μm.

Subsequently, a predetermined signal is applied to the gate bus lines 112, and thereby the TFT 118 of each of the picture elements is turned into an "ON" state. In addition, a voltage is applied to the data bus lines 117. Thereby, the liquid crystal molecules in each of the picture elements are aligned in predetermined directions. Thereafter, beams of ultraviolet light are irradiated, and thus the polymers are formed in the liquid crystal layer.

Figure 6:
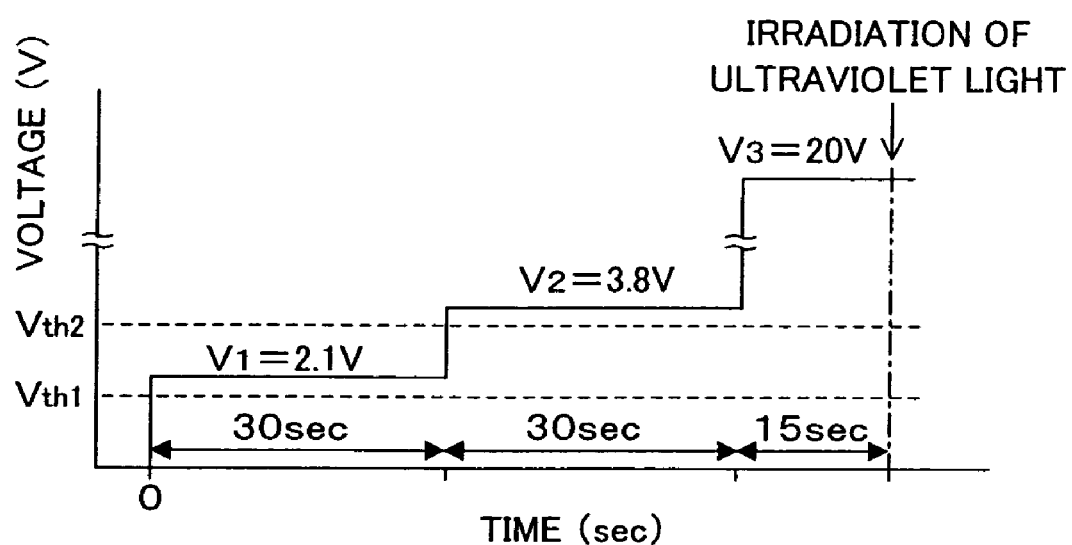
FIG. 6 is a schematic diagram showing change which is made in voltage applied to a data bus line while polymers are being formed.

FIG. 6 is a schematic diagram showing change which is made in voltage applied to a data bus line 117 while the polymers are being formed. Incidentally, a voltage drop stemming from the TFT can be ignored. As shown in FIG. 6, an AC voltage V1 (a 2.1-V voltage with a 100-Hz frequency in this case) slightly higher than a threshold voltage Vth1 (1.8 V) in the directly connected picture element region (a threshold voltage of the T-V characteristic: hereinafter referred to as the same) is applied to the data bus lines 117. Then, the alignment of the liquid crystal molecules is waited for to stabilize while the voltage V1 is being held for 30 seconds. Incidentally, it is desirable that the voltage V1 applied at this time be in a range expressed $$Vth1 < V1 \leq Vth1+1(V)$$

for the purpose of securely reducing disturbance in alignment of the liquid crystal molecules.

Then, an AC voltage V2 (a 3.8-V voltage with a 100-Hz frequency in this case) slightly higher than a threshold voltage Vth2 (3.3 V) in the capacitively coupled picture element regions is applied to the data bus lines 117. Then, the alignment of the liquid crystal molecules is waited for to stabilize while the voltage V2 is being held for 30 seconds. Incidentally, it is desirable that the voltage V2 applied at this time be in a range expressed $$Vth2 < V2 \leq Vth2+1(V)$$

for the purpose of securely reducing disturbance in alignment of the liquid crystal molecules.

Subsequently, an AC voltage V3 (a 20-V voltage with a 100-Hz frequency in this case) higher than a maximum voltage which is applied while the liquid crystal display device is being normally used (a white-displaying voltage: normally, 4 V to 6 V) is applied to the data bus lines 117, and is held for 15 seconds. Thereafter, the polymerizable components contained in the liquid crystal are polymerized by means of irradiating beams of ultraviolet (UV) light, and thus the polymers are formed. In this manner, the formation of the polymers is completed.

Figure 7:
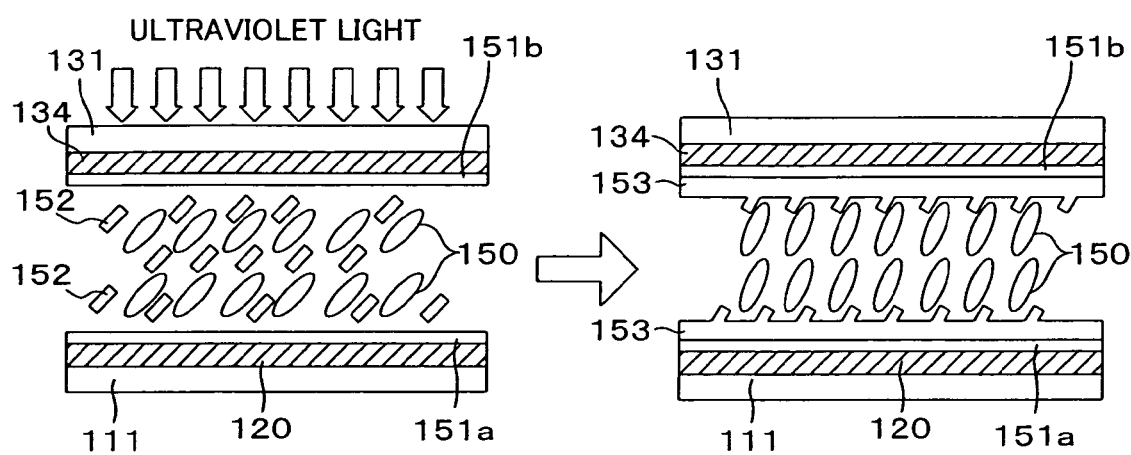
FIG. 7 is a diagram schematically showing conditions of liquid crystal molecules to be observed before and after ultraviolet light is irradiated on the liquid crystal molecules.

FIG. 7 is a diagram schematically showing conditions in which the liquid crystal molecules to be observed before and after ultraviolet light is irradiated on the liquid crystal molecules. In FIG. 7, reference numeral 150 denotes liquid crystal molecules. In addition, reference numeral 151a denotes the alignment film formed on the TFT substrate; and 151b, the alignment film formed on the opposing substrate. Furthermore, reference numeral 152 denotes monomers added to the liquid crystal; and 153, polymers formed through irradiation of beams of ultraviolet light.

In this manner, the polymers which determine directions in which the liquid crystal molecules tilt while voltage is being applied are formed in the liquid crystal layer. Thereafter, as shown in FIG. 4, the polarizing plates 141a and 141b are arranged respectively in the two sides of the liquid crystal panel 100 in the thickness direction. In addition, drive circuits and a backlight are installed in the liquid crystal panel 100. Thereby, the liquid crystal display device is completed.

As described above, in the case of this embodiment, while the polymerizable components added to the liquid crystal is being polymerized, first of all, the voltage V1 slightly higher than the threshold voltage Vth1 in the directly connected picture element region is applied to the liquid crystal, and the voltage V1 is held for the predetermined length of time. Thereafter, the voltage V2 slightly higher than the threshold voltage Vth2 in the capacitively coupled picture element regions is applied to the liquid crystal, and the voltage V2 is held for the predetermined length of time. Subsequently, the predetermined higher voltage V3 is applied to the liquid crystal. For this reason, the polymers are formed while inhibiting disturbance in alignment of the liquid crystal molecules. Accordingly, this brings about the effect of enhancing display quality of the liquid crystal display device.

FIG. 8A is a diagram showing a transmission condition of a liquid crystal display device actually manufactured in accordance with the first embodiment. FIG. 8B is a diagram showing a transmission condition of a liquid crystal display device used as a comparative example. Incidentally, in the case of the liquid crystal display device used as the comparative example, the polymers are formed in the liquid crystal layer in the following manner. A 20-V AC voltage is applied to the data bus lines at the same time as the TFTs are turned on, and the 20-V AC voltage is held for a certain length of time. Thereafter, beams of ultraviolet light are irradiated. Through comparison between FIG. 8A and FIG. 8B, it is learned that an extremely small amount of dark part stemming from disturbance in alignment of the liquid crystal molecules occurs in the liquid crystal display device manufactured in accordance with this embodiment in comparison with the liquid crystal display device used as the comparative example.

Second Embodiment

Hereinafter, descriptions will be provided for a second embodiment of the present invention.

Figure 9:
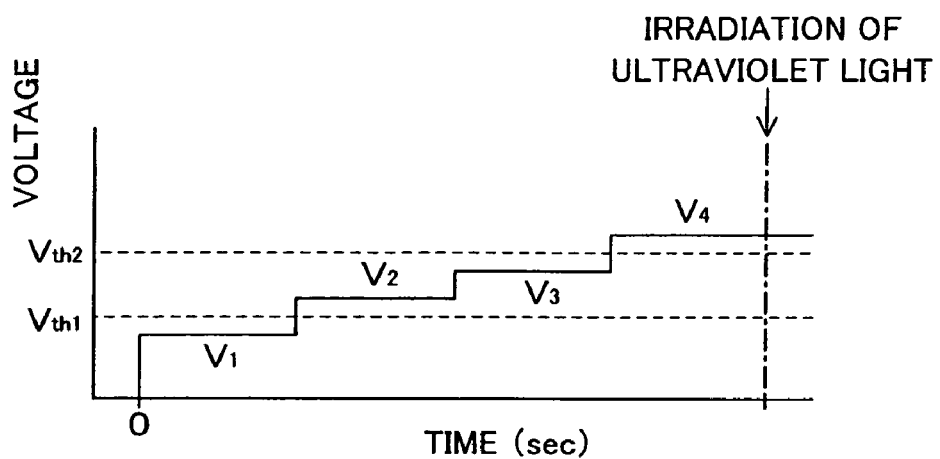
FIG. 9 is a schematic diagram showing change which is made in voltage applied to a data bus line while polymers are being formed in a case of a second embodiment of the present invention.

FIG. 9 is a schematic diagram showing change which is made in voltage applied to a data bus line while polymers are being formed in a case of the second embodiment. Incidentally, the structures respectively of the TFT substrate and the opposing substrate in the second embodiment are basically the same as those in the first embodiment are. For this reason, the descriptions for the structures will be omitted in this respect.

As shown in FIG. 9, in the case of this embodiment, first of all, a voltage V1 slightly lower than the threshold voltage Vth1 in the directly connected picture element region is applied to the data bus lines, and the voltage V1 is held for a certain length of time.

Subsequently, a voltage V2 slightly higher than the threshold voltage Vth1 in the directly connected picture element region is applied to the data bus lines, and the voltage V2 is held for a certain length of time. Thereafter, a voltage V3 (incidentally, V3>V2) slightly lower than the threshold voltage Vth2 in the capacitively coupled picture element regions is applied to the data bus lines, and the voltage V3 is held for a certain length of time.

Then, a voltage V4 slightly higher than the threshold voltage Vth2 in the capacitively coupled picture element regions is applied to the data bus lines, and the voltage V4 is held for a certain length of time. Thereafter, beams of ultraviolet light are irradiated, and thus the polymerizable components contained in the liquid crystal layer are polymerized. Thereby, the polymers are formed.

Figure 10:
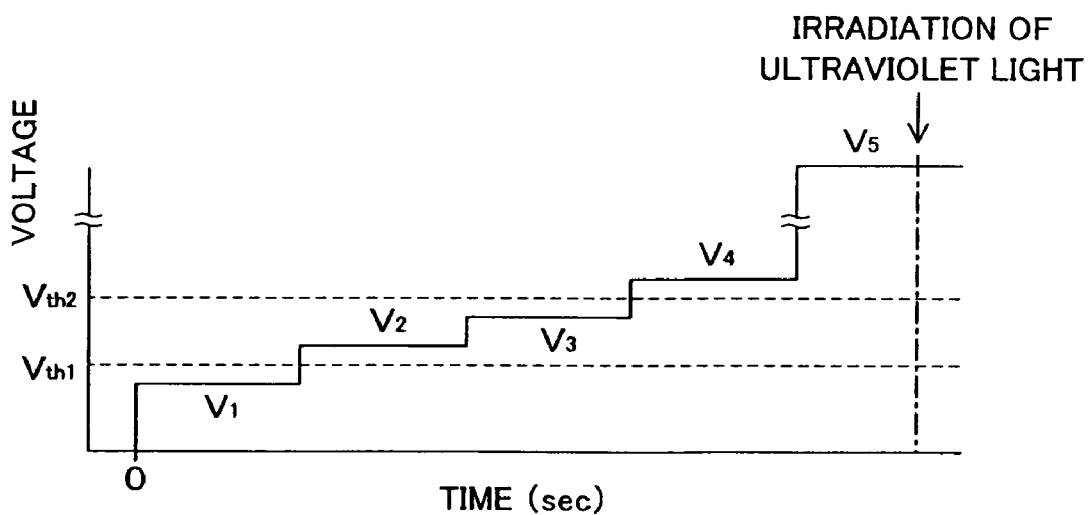
FIG. 10 is a schematic diagram showing another example of change which is made in voltage applied to the data bus line while polymers are being formed in a case of the second embodiment of the present invention.

It does not matter that the polymers are formed in the liquid crystal layer as shown in FIG. 10 in the following manner. A voltage V4 is applied to the data bus lines, and is held for a certain length of time. Thereafter, a voltage V5 (for example, 17 V) higher than a white-displaying voltage (approximately 4 to 6 V) which is applied to the data bus lines while the liquid crystal display device is being actually used is applied to the data bus lines, and the voltage V5 is held for a certain length of time. Subsequently, beams of ultraviolet light are irradiated, and thus the polymers are formed in the liquid crystal layer. This makes it possible to shorten time which is needed for the liquid crystal molecules to complete tilting in predetermined directions.

This embodiment brings about an effect similar to that which the first embodiment brings about. In addition, in a case of a liquid crystal display device manufactured by filling liquid crystal in the space between the TFT substrate and the opposing substrate by use of the one drop filling method, it is likely that display unevenness termed as a drop mark may occur in a place where liquid crystal is dispensed. However, the method according to this embodiment also brings about an effect of preventing the drop mark from occurring. Reasons why the drop mark occurs and reasons why the drop mark can be prevented by use of the method according to this embodiment are not clear. However, the following reasons are conceivable.

In the case of the vacuum filling method, a sealing material is applied to the margin outside the display region (a region where picture elements are arrayed in the form of a matrix) of the TFT substrate in a way that the applied portions are shaped like a frame. Thereafter, liquid crystal is dropped to several points on the TFT substrate. Subsequently, the TFT substrate and the opposing substrate are aligned to each other in vacuum. Then, the sealing material is hardened by irradiation of ultraviolet light or by a thermal process. In vacuum, moisture adhered to the surface of the alignment film is evaporated and removed in parts of the TFT substrate where liquid crystal has not been dropped, whereas moisture remains on the surface of the alignment film in parts of the TFF substrate where liquid crystal has been dropped. One may think that the remaining moisture makes resistance on the surface of the alignment film different from one part to another, and that accordingly the drop mark is caused. One may also think that application of a relatively high AC voltage to liquid crystal as in the case of this embodiment disperses moisture, which has remained partially in the surface of the alignment film, into the liquid crystal layer while the polymers are being formed, and that accordingly the drop mark can be avoided.

Hereinafter, descriptions will be provided for results of examining whether alignment characteristics of liquid crystal molecules were satisfactory or poor in each of liquid crystal display devices manufactured by changing conditions which were applied while polymers were being formed.

EXPERIMENT 1

To begin with, descriptions will be provided for results of examining a relationship between change in voltage applied to the data bus lines and the alignment characteristics of liquid crystal molecules.

TFT substrates and opposing substrates as shown in FIGS. 3 and 4 were manufactured. A vertical alignment film was formed on each of the surfaces of the TFT substrates and the opposing substrates by applying an alignment film material made by JSR Corporation to the surfaces of the TFT substrates and the opposing substrates. Then, liquid crystal was filled in spaces between the TFT substrates and the opposing substrates. Thereby, liquid crystal panels were formed. N-type liquid crystal (liquid crystal with negative dielectric anisotropy) made by Merck Ltd. was used as the liquid crystal. In addition, 0.3 wt % of monomers (diacrylate) capable of being polymerized by ultraviolet light was added to the liquid crystal.

Subsequently, voltages were applied to the liquid crystal layers respectively with conditions shown in FIG. 11. Monomers were polymerized by means of irradiation of ultraviolet light, and thus polymers were formed in each of the liquid crystal layers. Thereafter, polarizing plates were arranged respectively in the two sides of each of the liquid crystal panels, and a backlight was installed into each of the liquid crystal panels. Thus, the liquid crystal display devices used as Samples 1 to 5 were completed.

Then, a predetermined voltage was applied to the gate bus lines, the TFTs were thus turned to an "ON" state, and a 5-V AC voltage was applied to the data bus lines, in each of the liquid crystal display device used as Samples 1 to 5. Subsequently, conditions in which the liquid crystal was aligned were observed for each of the liquid crystal display device used as Samples 1 to 5. Incidentally, the threshold voltage $V_{th1}$ in the directly connected picture element region was 2.2 V, and the threshold voltage $V_{th2}$ in the capacitively coupled picture element regions was 3.0 V, in each of the liquid crystal display device used as Samples 1 to 5.

As a result, it was recognized that disclination occurred in each of the liquid crystal display devices used as Samples 1 to 3, and that alignment characteristics of the liquid crystal molecules were accordingly poor in each of the liquid crystal display devices used as Samples 1 to 3, as shown in FIG. 12. In the case of the liquid crystal display device used as Sample 1, the voltage V5 measuring 17 V was suddenly applied to the data bus lines. In the case of the liquid crystal display device used as Sample 2, the voltages V1 and V5 were sequentially applied to the data bus lines, but the voltages V2, V3 and V4 were not applied to the data bus lines. In the case of the liquid crystal display device used as Sample 3, the voltages V1, V2 and V5 were sequentially applied to the data bus lines, but neither the voltages V3 nor V4 were applied to the data bus lines. Less disclination occurred, and better alignment was exhibited, in the liquid crystal display device used as Sample 4 than the liquid crystal display devices used as Samples 1 to 3. In the case of the liquid crystal display device used as Sample 4, the voltages V1, V2, V4 and V5 were sequentially applied to the data bus lines, but the voltage V3 was not applied to the data bus lines. However, the alignment was disturbed in several picture elements throughout the panel in the liquid crystal display device used as Sample 4.

By contrast, in the case of the liquid crystal display device used as Sample 5, which was manufactured by applying the voltages V1 to V5 sequentially, the alignment was disturbed in no picture element, and extremely satisfactory alignment characteristics were exhibited. It can be learned, from the results of Experiment 1, that a liquid crystal display device exhibiting satisfactory alignment characteristics of the liquid crystal molecules can be manufactured by means of the sequential application of the voltages V1, V2, V3, V4 and V5 to the liquid crystal layer.

EXPERIMENT 2

Next, descriptions will be provided for results of examining relationships between time for which each of applied voltages was held and alignment characteristics of liquid crystal.

Liquid crystal display devices were manufactured while changing time for which each of the voltages V1 to V5 was applied during formation of polymers between 0.5 seconds and 60 seconds as shown in FIG. 13. Then, it was examined whether each of the liquid crystal display devices thus manufactured was satisfactory or poor in terms of alignment characteristics of the liquid crystal molecules. As a result, it was recognized that the liquid crystal display devices used as Samples 7 to 9 were satisfactory in terms of alignment characteristics. The liquid crystal display devices used as Samples 7 to 9 had been manufactured by applying each of the voltages for 2 seconds to 30 seconds. However, alignment characteristics were poor in the liquid crystal display device used as Sample 6 which had been manufactured by applying each of the voltages for as short as 0.5 seconds. One may consider that the reason for the poor alignment characteristics was as follows. The polymers were formed before the alignment of the liquid crystal molecules was stabilized. For this reason, the polymers stored the unstable alignment conditions, and thus the liquid crystal molecules were aligned in accordance with the unstable alignment conditions of the polymers.

In addition, alignment characteristics were satisfactory in the liquid crystal display device used as Sample 10 which had been manufactured by applying each of the voltages for 60 seconds. However, drop marks occurred in this liquid crystal display device. One may consider that the reason for the drop marks was as follows. Since the voltages were applied to this liquid crystal display device for a longer time, residual DC was accumulated in parts to which liquid crystal was dropped.

From Experiment 2, it was learned that time for which each of the voltages V1 to V5 was applied was desirably 2 to 30 seconds.

Incidentally, it does not matter that the time for which each of the voltages V1 to V4 was applied and held was shorter than time spent for the liquid crystal domain fabricated by use of voltage application to become stable. That is because the amount of change in voltage applied to the liquid crystal layer was smaller in this embodiment than in the first embodiment.

EXPERIMENT 3

Next, descriptions will be provided for results of examining whether alignment characteristics of the liquid crystal molecules were satisfactory or poor while DC voltages were being applied to the data bus lines during formation of polymers in each of liquid crystal display devices used as other samples.

The polymers were formed in the liquid crystal layer in the same manner as the polymers were formed in the case of Experiment 2, except that the DC voltages were applied to the data bus lines, in each of the liquid crystal display devices. Then, alignment characteristics of the liquid crystal molecules were examined in each of liquid crystal display devices. FIG. 14 shows the results.

As shown in FIG. 14, alignment characteristics were satisfactory in each of the liquid crystal display devices used as Samples 12 and 13. In the case of the liquid crystal display devices used as Sample 12, each of the voltages was applied for 2 seconds. In the case of the liquid crystal display devices used as Sample 13, each of the voltages was applied for 10 seconds. On the other hand, alignment characteristics were satisfactory, but drop marks occurred, in each of the liquid crystal display devices used as Samples 14 and 15. In the case of the liquid crystal display devices used as Sample 14, each of the voltages was applied for 30 seconds. In the case of the liquid crystal display devices used as Sample 15, each of the voltages was applied for 60 seconds. In addition, alignment characteristics were poor in the liquid crystal display devices used as Sample 11, where each of the voltages was applied for 0.5 seconds.

From Experiment 3, it is learned that process margin was narrower in the case where the DC voltages were applied than in the case where the AC voltages were applied.

From Experiments 1 to 3, it is learned that the followings are desirable. First, it is desirable that, while the polymers are being formed, the voltages V1 to V5 be applied in this sequence. The voltage V1 is slightly lower than the threshold voltage Vth1 in the directly connected picture element region. The voltages V2 and V3 (incidentally, V2<V3) are between the threshold voltage Vth1 in the directly connected picture element region and the threshold voltage Vth2 in the capacitively coupled picture element regions. The voltage V4 is slightly higher than the threshold voltage Vth2 in the capacitively coupled picture element regions. The voltage V5 is higher than the white-displaying voltage which is applied while the liquid crystal display device is actually being used. Second, it is desirable that, in this case, time for which each of the voltages V1 to V5 is applied be 2 to 30 seconds. Third, it is desirable that the AC voltages be applied instead of the DC voltages.

Third Embodiment

Hereinafter, descriptions will be provided for a third embodiment of the present invention.

In the case where liquid crystal is filled into the space between the TFT substrate and the opposing substrate by use of the one drop filling method, if bead-shaped spacers are used, the spacer move as the liquid crystal spreads over. As a result, the spacers cannot be distributed evenly throughout the panel. For this reason, in the case where liquid crystal is going to be filled into the space between the TFT substrate and the opposing substrate by use of the one drop filling method, column-shaped spacers formed of a photoresist (hereinafter referred to as "photo-spacers") are beforehand formed on one of the TFT substrate and the opposing substrate. It is usual that the photo-spacers are arranged in the intersections between the gate bus lines and the data bus lines. These intersections are parts where light is blocked by the black matrices. Thus, the aperture ratio can be prevented from decreasing due to the photo-spacer.

However, in the case of a liquid crystal display device which has the capacitively coupled picture element electrodes as shown in FIG. 3, it has been found that influence of defect in alignment of the liquid crystal molecules which stems from the spacers, reaches the capacitively coupled picture element regions. That is because the capacitively coupled picture element electrodes have weaker alignment controlling force over the liquid crystal molecules than the directly connected picture element electrodes have due to voltage applied to the capacitively coupled picture element electrodes being lower.

Figure 1:
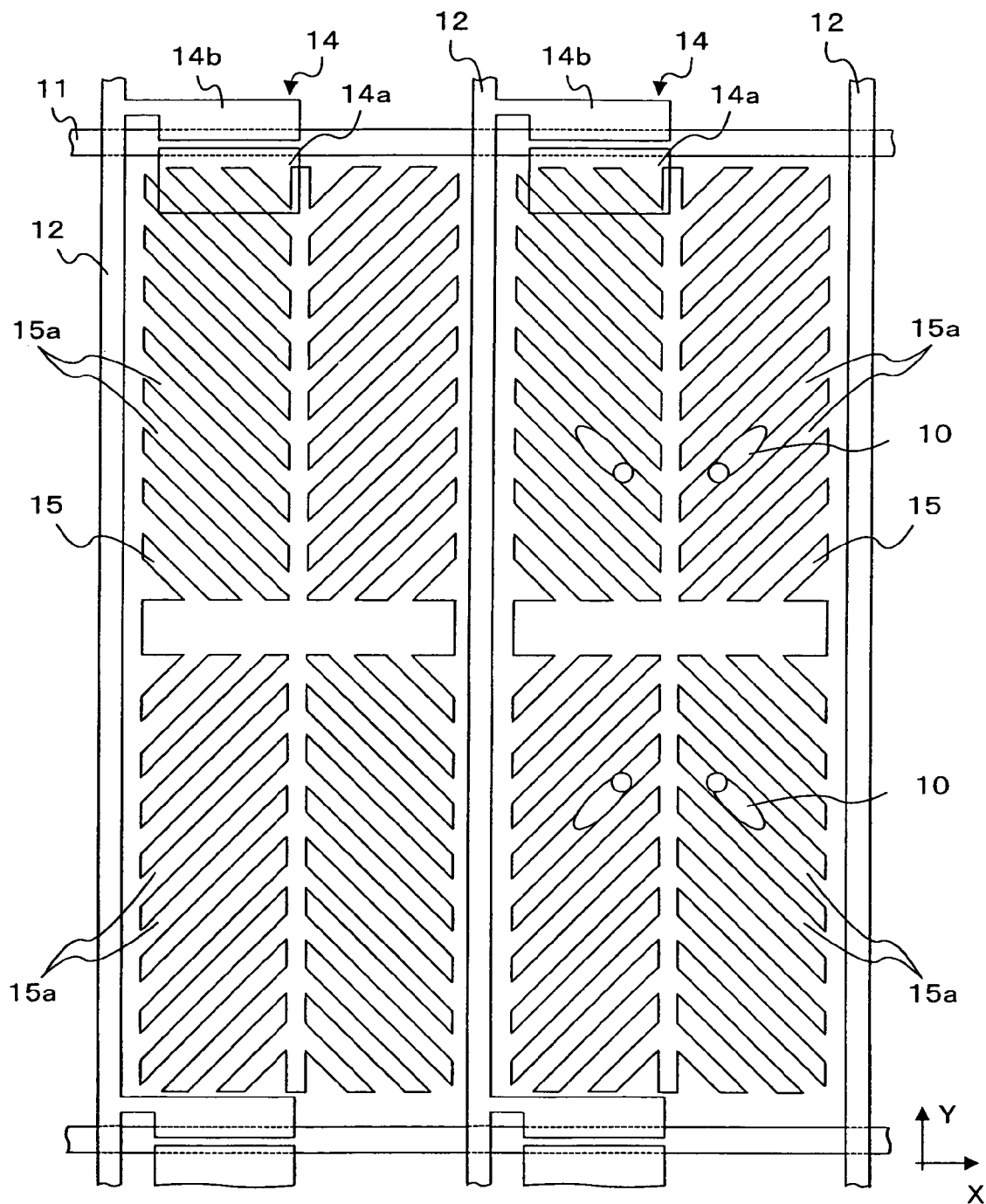
FIG. 1 is a plan view showing a conventional MVA mode liquid crystal display device.
Figure 2:
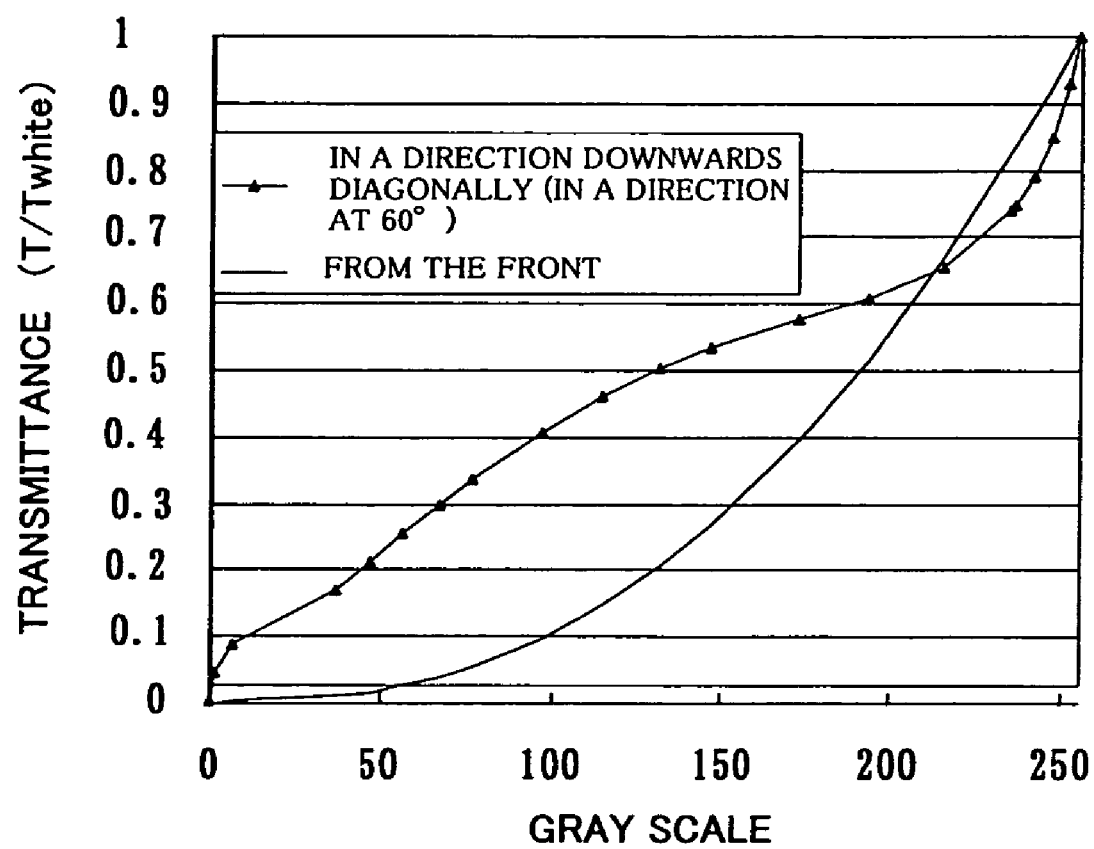
FIG. 2 is a diagram showing a T-V characteristic to be observed when the MVA mode liquid crystal display device is viewed from the front, and a T-V characteristic to be observed when the MVA mode liquid crystal display device is viewed downwards in an oblique direction.
Figure 15A:
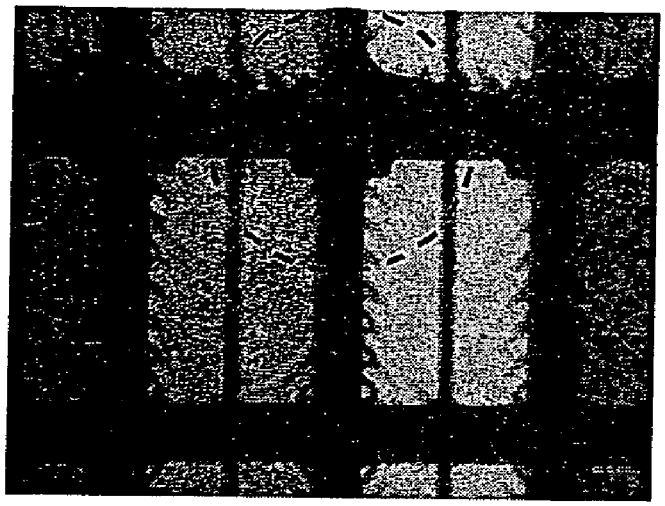
FIG. 15A is a diagram showing a transmission condition of the liquid crystal display device shown in FIG. 1.
Figure 15B:
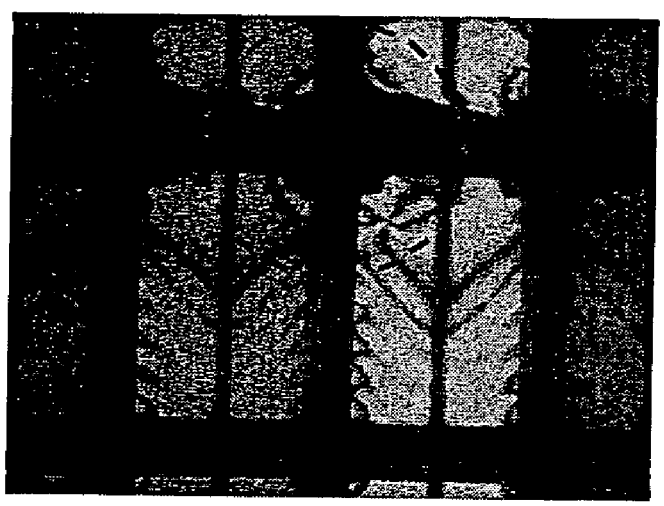
FIG. 15B is a diagram showing a transmission condition of the liquid crystal display device shown in FIG. 3.

FIG. 15A is a diagram showing a transmission condition of the liquid crystal display device (a liquid crystal display device having no capacitively coupled picture element electrode) shown in FIG. 1. FIG. 15B is a diagram showing a transmission condition of the liquid crystal display device (a liquid crystal display device having capacitively coupled picture element electrodes) shown in FIG. 3. Incidentally, a photo-spacer is arranged in an intersection (parts indicated by a circle in the figures) between a gate bus line and a data bus line in each of the two liquid crystal display devices.

From comparison between FIGS. 15A and 15B, it is learned that influence of alignment abnormality stemming from the photo-spacer reaches the outsides of the black matrix (in other words, the capacitively coupled picture element regions) in a liquid crystal display device having capacitively coupled picture element electrodes.

With this taken into consideration, in the case of this embodiment, photo-spacers are formed respectively in positions away from capcitively coupled picture element regions. Hereinafter, descriptions will be provided for this with reference to the drawing.

Figure 16:
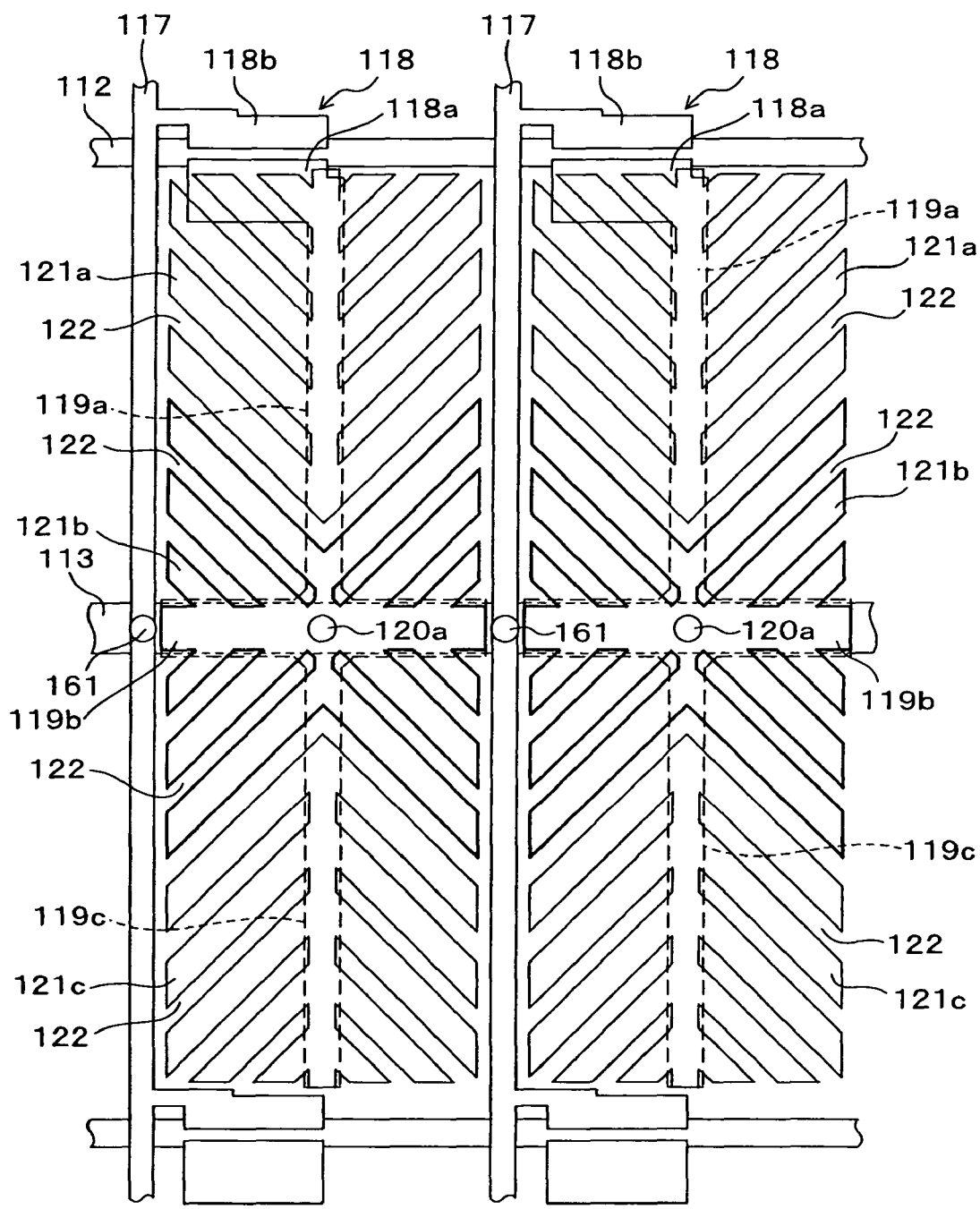
FIG. 16 is a plan view showing a liquid crystal display device according to a third embodiment of the present invention.

FIG. 16 is a plan view showing a liquid crystal display device according to the third embodiment of the present invention. In FIG. 16, the same reference numerals are used to denote the same or similar components as those in FIG. 3, so that the descriptions will be omitted.

In the case of this embodiment, photo-spacers 161 are arranged respectively in parts (areas adjacent respectively to directly connected picture element regions) where the auxiliary capacitance bus lines 113 and the data bus lines 117 cross over with each other. These photo-spacers 161 are formed on the opposing substrate. The tips of the respective photo-spacers 161 come into contact with the TFT substrate, and thus the photo-spacers 161 keep a constant interval (cell gap) between the TFT substrate and the opposing substrate.

The photo-spacers 161 are formed through the following steps. A photoresist is applied to the top of the common electrode, and thereafter is exposed and developed. After the photo-spacers 161 are formed, a vertical alignment film is applied to the surfaces of the common electrode and the photo-spacers 161.

A liquid crystal display device according to this embodiment was actually manufactured, and the alignment conditions around the photo-spacers were examined. Incidentally, while the polymers were being formed in the liquid crystal layer, the voltages were applied to the liquid crystal layer with the conditions shown in Sample 5 of the second embodiment. As a result, it was recognized that there was no disturbance in alignment of the liquid crystal molecules which stemmed from the photo-spacers, and that the alignment characteristics were accordingly satisfactory.

Incidentally, it does not matter that the photo-spacers are formed on the TFT substrate, although the photo-spacers were formed on the opposing substrate in the case of the aforementioned embodiment. In addition, it does not matter that the photo-spacers are formed respectively in the directly connected picture element regions, although the descriptions have been provided for the case where the photo-spacers were formed respectively in the areas adjacent to the directly connected picture element regions. For example, the photo-spacers can be formed respectively in positions where the directly connected picture element regions and the auxiliary capacitance bus lines 113 cross over each other.

What is claimed is:

1. A liquid crystal display device including, in one picture element, a plurality of sub-picture-element regions having transmittance-applied voltage characteristics which are different from one region to another, which comprises:
   first and second substrates arranged opposite to each other;
   a liquid crystal layer made of liquid crystal filled in the space between the first and the second substrates;
   a polymer which is formed in the liquid crystal layer, and which determines alignment orientations of liquid crystal molecules while a voltage is being applied;
   a spacer which is arranged in any one of a sub-picture-element region, which has the lowest threshold voltage of the transmittance-applied voltage characteristic among the plurality of sub-picture-element regions in the one picture element, and a region adjacent to the sub-picture-element region, and which determines the thickness of the liquid crystal layer;

a switching element supported by the first substrate;

a control electrode in said first picture element, the control electrode being directly connected to the switching element;

an insulating film provided over at least the switching element and the control electrode;

a plurality of sub-picture-element electrodes in said one picture element on the insulating film;

wherein a sub-picture-element electrode, among the plurality of sub-picture-element electrodes, is arranged in the sub-picture-element region having the lowest threshold voltage of the transmittance-applied voltage characteristic is electrically connected to the control electrode, wherein sub-picture-element electrodes, among the plurality of sub-picture-element electrodes, arranged respectively in the other sub-picture-element regions are capacitively coupled with the control electrode via the insulating film; and wherein a plurality of slits are formed in each of the plurality of sub-picture-element electrodes in said one picture element.

2. The liquid crystal display device according to claim 1, wherein each of the plurality of sub-picture-element electrodes is divided into at least two domain controlling regions whose alignment orientations of liquid crystal molecules are different from one another, and wherein each of the domain controlling regions includes a plurality of band-shaped microelectrode parts provided between the plurality of slits and arranged in parallel with one another.

* * * * *